(12) United States Patent
Hsu et al.

(10) Patent No.: US 7,804,058 B2
(45) Date of Patent: Sep. 28, 2010

(54) OPTICAL TWEEZERS CONTROLLING DEVICE

(75) Inventors: Long Hsu, Hsinchu (TW); Cheng-Hsien Liu, Hsinchu (TW); Sheng-Yang Tseng, Jhubei (TW); Ai-Tang Chang, Hsinchu County (TW); Chung-Cheng Chou, Taoyuan County (TW); William Wang, Taoyuan (TW); Fung-Hsu Wu, Taoyuan County (TW); Chen Peng, Taipei (TW); Ta-Yuan Lee, Taipei County (TW)

(73) Assignee: Raydium Semiconductor Corporation, Hsinchu (TW)

( * ) Notice: Subject to any disclaimer, the term of this patent is extended or adjusted under 35 U.S.C. 154(b) by 296 days.

(21) Appl. No.: 12/222,249

(22) Filed: Aug. 6, 2008

(65) Prior Publication Data

US 2009/0051999 A1    Feb. 26, 2009

(30) Foreign Application Priority Data

Aug. 23, 2007    (TW)    .............................. 96131312 A

(51) Int. Cl.
*H01S 1/00*    (2006.01)
*H01S 3/00*    (2006.01)
*H05H 3/02*    (2006.01)

(52) U.S. Cl. ................... 250/251; 250/573; 250/222.2; 250/221; 359/558; 359/279; 359/566; 359/614; 359/361; 359/226.1; 359/62

(58) Field of Classification Search ................. 250/251, 250/573, 222, 2, 221; 359/558, 279, 566, 359/614, 361, 350, 226.1, 629
See application file for complete search history.

(56) References Cited

U.S. PATENT DOCUMENTS

| 2002/0020800 A1* | 2/2002 | Knebel et al. | 250/201.3 |
| 2008/0174870 A1* | 7/2008 | Hsu et al. | 359/558 |
| 2009/0032692 A1* | 2/2009 | Hsu et al. | 250/251 |
| 2009/0052038 A1* | 2/2009 | Hsu et al. | 359/558 |
| 2009/0273831 A1* | 11/2009 | Hsu et al. | 359/387 |
| 2010/0108872 A1* | 5/2010 | Liu et al. | 250/251 |

\* cited by examiner

*Primary Examiner*—Jack I Berman
*Assistant Examiner*—Meenakshi S Sahu
(74) *Attorney, Agent, or Firm*—Bacon & Thomas, PLLC

(57) ABSTRACT

An optical tweezers controlling device including a light source, an objective lens and a focus adjusting unit is provided. The focus adjusting unit disposed between the light source and the objective lens includes a mirror set and a zoom lens set. The mirror set has at least a mirror. The mirror is rotatable such that after a light of the light source is projected to the mirror, the reflective direction of the light reflected from the mirror is changeable. The zoom lens set has at least a zoom lens disposed in accordance with the mirror. By rotating the mirror or changing the focal length of the zoom lens, the focusing location of the light changes on the focal plane of the objective lens or in the front or the rear of the focal plane.

20 Claims, 5 Drawing Sheets

OPTICAL TWEEZERS CONTROLLING DEVICE

This application claims the benefit of Taiwan application Serial No. 96131312, filed Aug. 23, 2007, the subject matter of which is incorporated herein by reference.

BACKGROUND OF THE INVENTION

1. Field of the Invention

The invention relates in general to an optical tweezers controlling device, and more particularly to an optical tweezers controlling device capable of changing the location of the optical tweezers in the space.

2. Description of the Related Art

The optical tweezers technology using the focusing of the laser beam has been used in the fields such as micro-mechanical system and biomedicine. The laser beam, which generates a capture effect to particles, can be used to control the movement of particles. In the mechanism of the controlling of particle movement, the gradient of the optical pressure received by the particles makes particles to generate linear, deflective or whir-pooled particle movement.

Despite the optical tweezers technology that has great use in the control of micron-size particles, the optical tweezers technology can only control the particles on a focal plane through the focusing of the laser beam, and still fail to freely control the movement of particles in the space.

SUMMARY OF THE INVENTION

The invention is directed to an optical tweezers controlling device. With the incorporation of the mirror set and the zoom lens set, the focusing location of the laser beam can change freely in the space.

According to a first aspect of the present invention, an optical tweezers controlling device is provided. The device includes a light source, an objective lens and a focus adjusting unit. The focus adjusting unit disposed between the light source and the objective lens includes a mirror set and a zoom lens set. The mirror set includes at least a mirror. The mirror is rotatable such that after a light of the light source is projected to the mirror, the reflective direction of the light reflected from the mirror is changeable. The zoom lens set includes at least a zoom lens disposed in accordance with the mirror. By rotating the mirror or changing the focal length of the zoom lens, the focusing location of the light changes on the focal plane of the objective lens or in the front or the rear of the focal plane.

According to a second aspect of the present invention, an optical tweezers controlling device is provided. The device includes a light source, an objective lens and a focus adjusting unit. The focus adjusting unit disposed between the light source and the objective lens includes a mirror set. The mirror set has at least a row of mirrors including several rotatable mirrors. The rotatable mirrors are capable of changing the reflective direction of the light reflected from the mirror set after a light of the light source is projected to the mirror set. By rotating the mirrors, the focusing location of the light changes on the focal plane of the objective lens.

According to a third aspect of the present invention, an optical tweezers controlling device is provided. The device includes a light source, an objective lens and a focus adjusting unit. The focus adjusting unit disposed between the light source and the objective lens includes at least a row of zoom lens. By changing the focal length of each zoom lens, the focusing location of the light of the light source changes on the focal plane of the objective lens or in the front or the rear of the focal plane.

The invention will become apparent from the following detailed description of the preferred but non-limiting embodiments. The following description is made with reference to the accompanying drawings.

DETAILED DESCRIPTION OF THE INVENTION

An optical tweezers controlling device is disclosed in the present embodiment of the invention. The device includes a light source, an objective lens and a focus adjusting unit. The focus adjusting unit includes a mirror set and a zoom lens set, wherein the focus adjusting unit is disposed between the light source and the objective lens. By rotating the mirrors of the mirror set or changing the zoom lens set, the focusing location of the light changes on the focal plane of the objective lens or in the front or the rear of the focal plane. The design of the optical tweezers controlling device is elaborated below with accompanying drawings.

Figure 1:
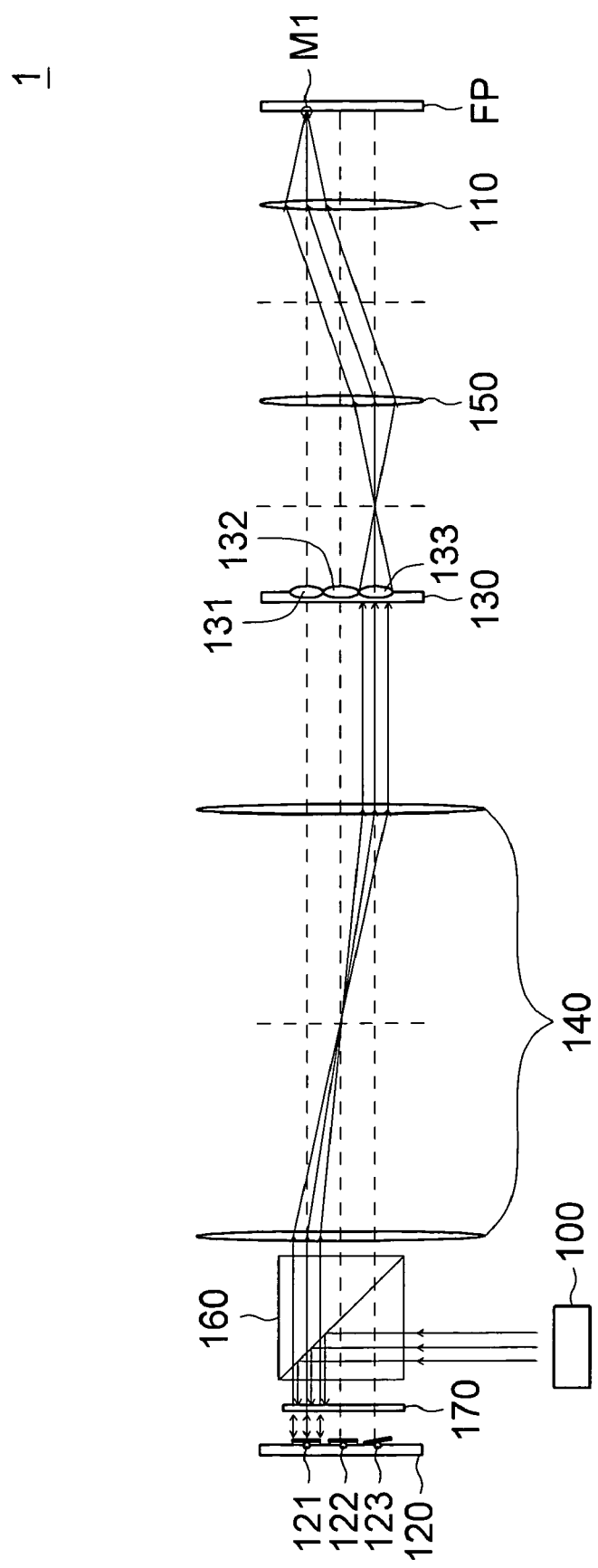
FIG. 1 shows an optical tweezers controlling device according to a preferred embodiment of the invention.

Referring to FIG. 1, an optical tweezers controlling device according to a preferred embodiment of the invention is shown. As indicated in FIG. 1, the optical tweezers controlling device 1 includes a light source 100, an objective lens 110 and a focus adjusting unit, wherein the focus adjusting unit is disposed between the light source 100 and the objective lens 110. The focus adjusting unit includes a mirror set 120 and a zoom lens set 130. The mirror set 120 includes at least a mirror. The mirror is rotatable, such that after a light of the light source 100 is projected to the mirror, the reflective direction of the light reflected from the mirror is changeable. The zoom lens set 130 includes at least a zoom lens disposed in accordance with the mirror. By rotating the mirror or changing the focal length of the zoom lens, the focusing location of the light will change on the focal plane FP or in the front or the rear of the focal plane FP. In the present embodiment of the invention, the light source 100 is, for example, a laser beam source. The laser beam, having the features of high orientation and high intensity, is ideal for the light source 100.

As for the disposition of the focus adjusting unit, the zoom lens set 130 is preferably disposed between the mirror set 120 and the objective lens 110. As shown in FIG. 1, the optical tweezers controlling device 1 further includes a first lens set 140, a second lens set 150, a polarized beam splitter 160 and a quarter wave plate 170. The first lens set 140 is disposed between the mirror set 120 and the zoom lens set 130. The second lens set 150 is disposed between the zoom lens set 130 and the objective lens 110. The polarized beam splitter 160 is disposed between mirror set 120 and the first lens set 140. The quarter wave plate 170 is disposed between the mirror set 120 and the polarized beam splitter 160.

In the present embodiment of the invention, the mirror set 120 includes several rotatable mirrors 121~123, and the zoom lens set 130 includes several zoom lenses 131~133, wherein both the mirrors 121~123 and the zoom lenses 131~133 are arranged in a row. The mirror set 120, such as a digital mirror device (DMD), has several rotatable small mirrors for adjusting the reflective direction of the light. The zoom lenses 131~133 are, for example, liquid lenses or preferably electro-liquid lenses. The electro-liquid lens will change its thickness under different voltages. Therefore, if the electro-liquid lens is used as an element of the zoom lens set 130, the focal length of the electro-liquid lens is adjustable by itself.

When the laser beam (linear polarized beam) emitted from the light source 100 enters one side of the polarized beam splitter 160, the polarized beam splitter 160 makes the laser beam deflected and projected to the quarter wave plate 170. After the laser beam passes through the quarter wave plate 170, the laser beam is projected to the mirrors of the mirror set 120 such as a mirror 121 for example. After the laser beam is reflected from the mirror 121 and again passes through quarter wave plate 170, the laser beam again enters the polarized beam splitter 160. Then, the laser beam sequentially passes through the first lens set 140, the zoom lens 133 of the zoom lens set 130, and second lens set 150. Lastly, the laser beam is focused on the focal plane FP (such as the focusing location M1) of the objective lens 110. As each mirror of the mirror set 120 is rotatable and the focal length of each zoom lens of the zoom lens set 130 is also changeable, the focusing location of the laser beam can be controlled to be on the focal plane FP or in the front or the rear of the focal plane FP.

Figure 2:
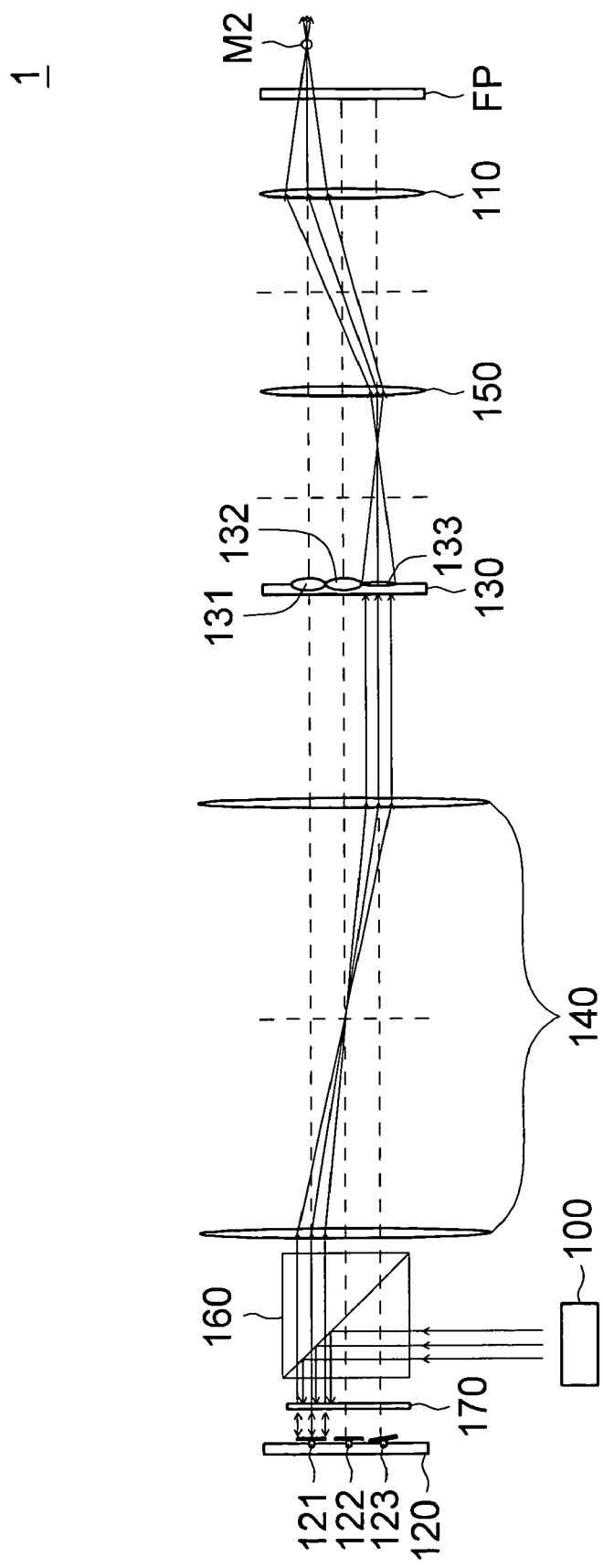
FIG. 2 shows the change of the focal length for a zoom lens of FIG. 1.

Referring to FIG. 2, the change of the focal length for a zoom lens of FIG. 1 is shown. As indicated in FIG. 2, let the zoom lens 133 alone become thinner. As the focal length of the zoom lens is inversely proportional to the thickness of the zoom lens, the focal length becomes larger if the thickness of the zoom lens 133 becomes smaller. After the laser beam passes through the second lens set 150 and the objective lens 110, the laser beam is focused in the rear of the focal plane FP (such as the focusing location M2). If the zoom lens 133 becomes thicker, the focal length of the zoom lens 133 becomes shorter, such that the laser beam is focused in the front of the focal plane of the objective lens. Thus, by adjusting the thickness of any zoom lens of the zoom lens set 130, the focusing location of the laser beam is changed to be located in the front or the rear of the focal plane FP.

Figure 3:
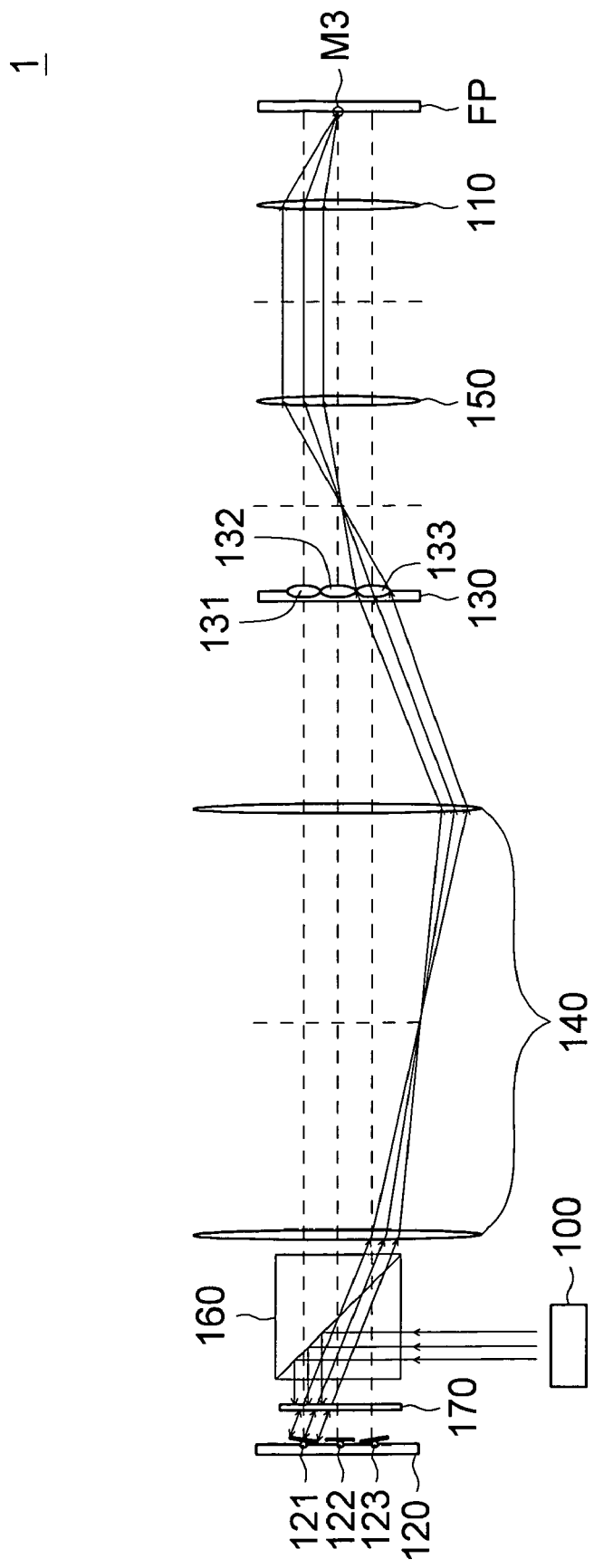
FIG. 3 shows the rotation of the mirrors of FIG. 1.

Referring to FIG. 3, the rotation of the mirrors of FIG. 1 is shown. As indicated in FIG. 3, let the mirror 121 of the mirror set 120 rotate a small angle clockwise. As the mirror 121 changes the reflective direction of the laser beam reflected from the mirror 121, the laser beam enters the polarized beam splitter 160 at a tilted angle and then passes through the first lens set 140, the zoom lens 133, the second lens set 150 and the objective lens 110 in sequence. Lastly, the laser beam is focused on other location (such as the focusing location M3) of the focal plane FP.

Figure 4:
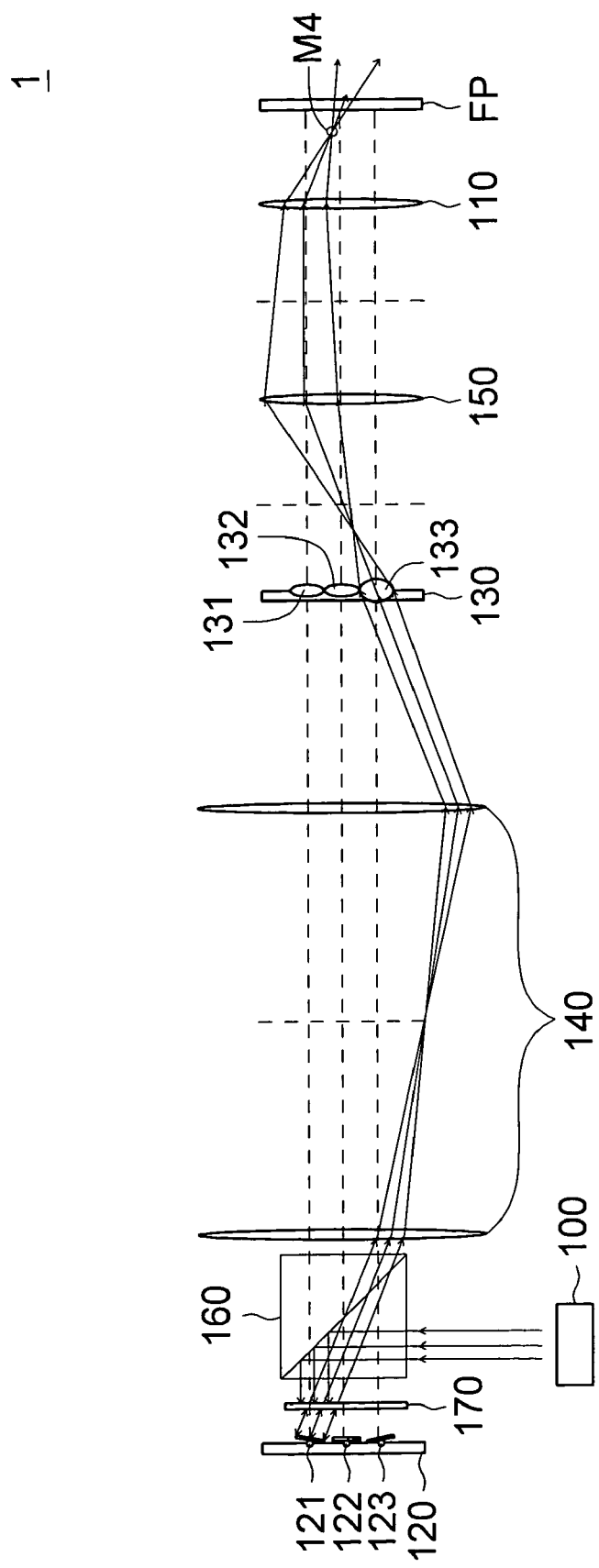
FIGS. 4~5 show changes in the focal length for a zoom lens of FIG. 3.
Figure 5:
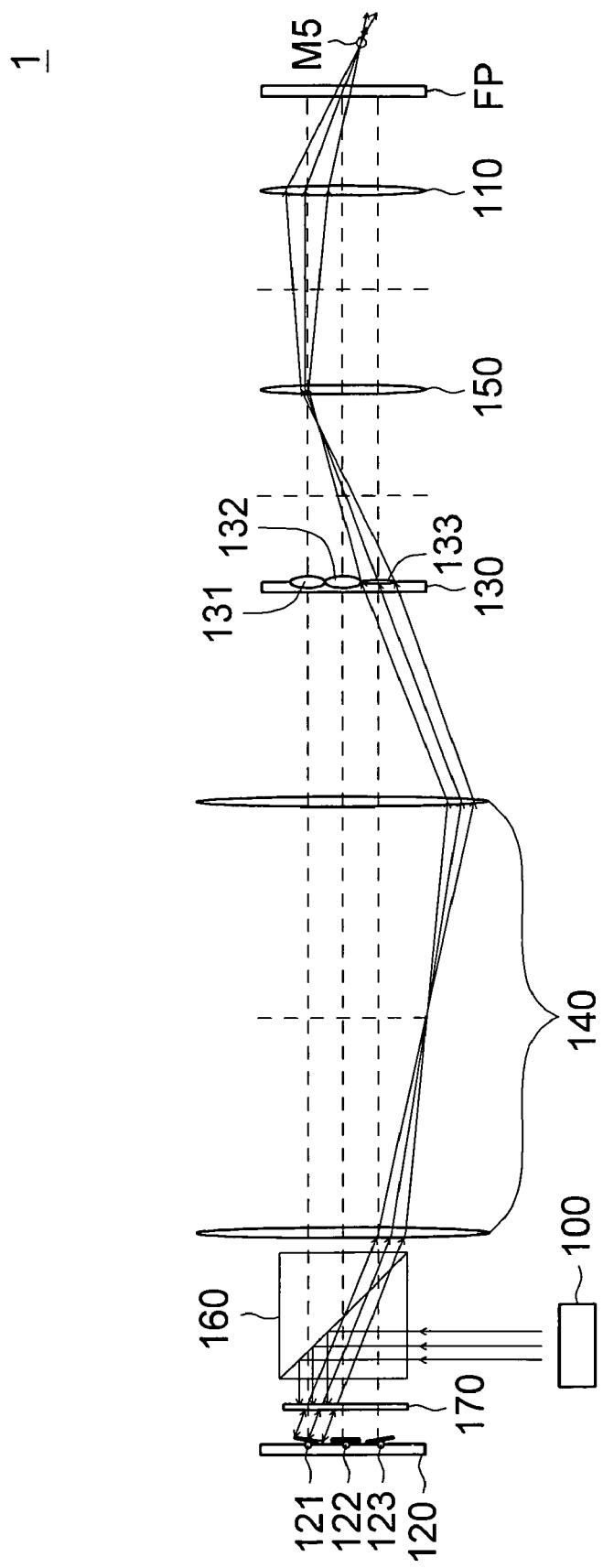

Alternatively, the rotation angle of the mirror of the mirror set 120 and the focal length of the zoom lens of the zoom lens set 130 can be adjusted at the same time. Referring to FIGS. 4~5, changes in the focal length for a zoom lens of FIG. 3 are shown. After the mirror 121 rotates for an angle, the laser beam is already shifted to the focusing location M3 from the focusing location of M1 (referring to FIG. 1 and FIG. 3). Meanwhile, as indicated in FIG. 4, if the zoom lens 133 is made thicker, the focusing location of the laser beam will shift to the front of the focal plane FP (such as the focusing location M4) since the focal length of the zoom lens 133 is inversely proportional to the thickness of the zoom lens 133. If the zoom lens 133 is made thinner, as indicated in FIG. 5, the focusing location of the laser beam shifts to the rear of the focal plane FP (such as the focusing location M5).

In the present embodiment of the invention, the mirror set 120 is exemplified with the mirrors 121~123 arranged in a row, and the zoom lens set 130 is exemplified with the zoom lenses 131~133 arranged in a row, but the invention is not limited thereto. In other embodiments, the mirror set 120 and the zoom lens set 130 may include more mirrors and zoom lenses. Preferably, the mirrors or the zoom lenses are arranged in an array on a plane, and one mirror is disposed in accordance with one zoom lens. Thus, apart from controlling the laser beam to be focused in the front of the rear of the focal plane FP, the optical tweezers controlling device 1 can further control the laser beam to shift along different paths, so as to change the focusing location on the focal plane FP.

In the present embodiment of the invention, the optical tweezers controlling device 1 is exemplified with the zoom lens set 130. However, in other embodiments, an ordinary optical lens can be used to cooperate with a rotatable mirror. For example, several optical lenses may be disposed on a mechanism moveable with respect to the mirror set 120. Thus, when the mechanism drives the lens to move away or towards the mirror set 120, the focusing location of the laser beam can also be changed to the front or the rear of the focal plane.

The optical tweezers controlling device 1 of the present embodiment of the invention is used to control the particle movement of micro-fluidic system. The design parameters of the elements of the optical tweezers controlling device 1 are adjusted to fit actual needs. For example, the lens set with suitable focal length and number of lens, the objective lens, and the polarized beam splitter are selected such that the focusing location of the laser beam is located within a predetermined range. During operation, an examining object carrying particles is disposed within the predetermined range. By adjusting both the rotation angle of the mirror and the focal length of the zoom lens, the focusing location of the laser beam in the space is changed, and the particles captured by the optical tweezers move accordingly.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical tweezers controlling device, comprising:
   a light source for generating a light;
   an objective lens having a focal plane; and
   a focus adjusting unit disposed between the light source and the objective lens, wherein the focus adjusting unit comprises:
      a mirror set having at least a mirror, wherein the mirror is rotatable such that the reflective direction of the light reflected from the mirror is changeable; and
      a zoom lens set having at least a zoom lens disposed in accordance with the mirror, wherein the focal length of the zoom lens is changeable;
   wherein, by rotating the mirror or changing the focal length of the zoom lens, the focusing location of the light changes on the focal plane of the objective lens or in the front or the rear of the focal plane.

2. The optical tweezers controlling device according to claim 1, wherein the mirror set comprises a plurality of rotatable mirrors.

3. The optical tweezers controlling device according to claim 2, wherein the mirrors of the mirror set are arranged in an array.

4. The optical tweezers controlling device according to claim 1, wherein the zoom lens set comprises a plurality of zoom lenses.

5. The optical tweezers controlling device according to claim 4, wherein the zoom lenses of the zoom lens set are arranged in an array.

6. The optical tweezers controlling device according to claim 1, wherein the zoom lens is a liquid lens or an electro-liquid lens.

7. The optical tweezers controlling device according to claim 1, wherein the mirror set is a digital mirror device (DMD).

8. The optical tweezers controlling device according to claim 1, wherein the zoom lens set is disposed between the mirror set and the objective lens.

9. The optical tweezers controlling device according to claim 8, further comprising:
a first lens set disposed between the mirror set and the zoom lens set; and
a second lens set disposed between the zoom lens set and the objective lens.

10. The optical tweezers controlling device according to claim 8, further comprising:
a polarized beam splitter disposed between the mirror set and the zoom lens set; and
a quarter wave plate disposed between the mirror set and the polarized beam splitter.

11. The optical tweezers controlling device according to claim 1, wherein the light source is a laser beam source.

12. An optical tweezers controlling device, comprising:
a light source for generating a light;
an objective lens having a focal plane; and
a focus adjusting unit disposed between the light source and the objective lens, wherein the focus adjusting unit comprises a mirror set having at least a row of mirrors, and the row of mirrors comprises a plurality of rotatable mirrors such that after the light from the light source is projected to the mirror set, the reflective direction of the light reflected from the mirror set is changeable;
wherein, by rotating the mirrors, the focusing location of the light changes on the focal plane of the objective lens.

13. The optical tweezers controlling device according to claim 12, wherein the focus adjusting unit further comprises a zoom lens set disposed in accordance with the mirror set.

14. The optical tweezers controlling device according to claim 13, wherein the zoom lens set is disposed between the mirror set and the objective lens.

15. The optical tweezers controlling device according to claim 14, further comprising:
a first lens set disposed between the mirror set and the zoom lens set; and
a second lens set disposed between the zoom lens set and the objective lens.

16. The optical tweezers controlling device according to claim 14, further comprising:
a polarized beam splitter disposed between the mirror set and the zoom lens set; and
a quarter wave plate disposed between the mirror set and the polarized beam splitter.

17. The optical tweezers controlling device according to claim 12, wherein the mirror set is a DMD.

18. An optical tweezers controlling device, comprising:
a light source for generating a light;
an objective lens having a focal plane; and
a focus adjusting unit disposed between the light source and the objective lens, wherein the focus adjusting unit comprises at least a row of zoom lens, and the focal length of each zoom lens is changeable;
wherein, by changing the focal length of each zoom lens, the focusing location of the light changes in the front or the rear of the focal plane of the objective lens.

19. The optical tweezers controlling device according to claim 18, wherein the focus adjusting unit further comprises at least a row of mirrors disposed in accordance with the row of zoom lenses.

20. The optical tweezers controlling device according to claim 19, wherein the row of zoom lens is disposed between the row of mirrors and the objective lens.

* * * * *